Figure 1:
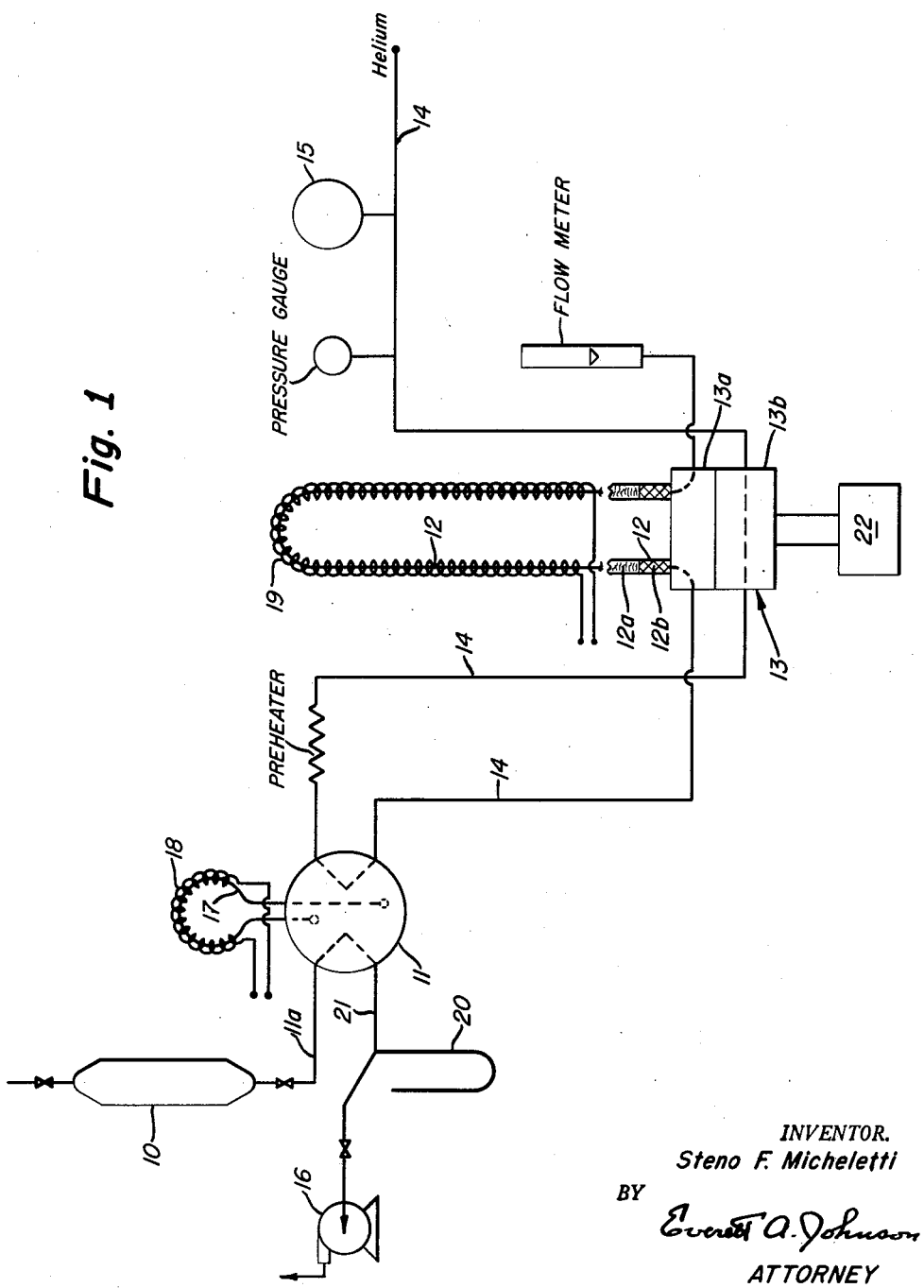

May 8, 1962 S. F. MICHELETTI 3,032,953
PROCESS AND APPARATUS FOR GAS CHROMATOGRAPHY
Filed Sept. 30, 1959 2 Sheets-Sheet 1

INVENTOR.
Steno F. Micheletti
BY
Everett A. Johnson
ATTORNEY

# United States Patent Office 3,032,953
Patented May 8, 1962

3,032,953
PROCESS AND APPARATUS FOR GAS CHROMATOGRAPHY
Steno F. Micheletti, Galveston, Tex., assignor, by mesne assignments, to Standard Oil Company, Chicago, Ill., a corporation of Indiana
Filed Sept. 30, 1959, Ser. No. 843,392
9 Claims. (Cl. 55—62)

This invention relates to the analysis of product streams for determining the concentration of methyl mercaptan therein by means of a partitioning solvent. More particularly, the invention relates to a system for gas chromatographic quantitative separation of high purity methyl mercaptan from wide boiling range components.

Vapor-phase or gas chromatography is an analytical method that gives rapid, accurate analyses of complex mixtures of volatile materials in simple, inexpensive equipment. Separations take place in small columns packed with a specific type of packing selected to accomplish particular separations. Components of a sample are separated as they are carried through the column by an eluting gas and determined as they pass out of the column by a sensitive detector such as a thermal-conductivity cell. Vapor-phase chromatography is of two general types: adsorption, in which active adsorbents are used as column packing, and partition, in which the packing consists of a stationary liquid phase coating a finely-divided inert solid, such as celite. In partition chromatography separation results from differences in vapor pressure of the components of a sample over the stationary liquid. Nitrogen, helium, hydrogen, and carbon dioxide are common eluting gases.

In the syntheses of high purity methyl mercaptan by reacting commercial grade methanol and hydrogen sulfide over activated aluminum at 600° F. and 300–400 pounds per square inch pressure, the product stream includes methyl mercaptan in the presence of wide boiling range components, including alcohol, ether, sulfides, hydrocarbons, and high boiling mercaptans in admixture. It is desired to quantitatively determine the presence of methyl mercaptan in such streams and heretofore this has been done by a mass spectroscopic technique. However, this is a rigid analysis which is time-consuming and involves problems in the apparatus, as well as requiring calculations based on the apparatus results. Accordingly, it would be desirable to employ gas chromatography to effect the analysis. Many types of material have heretofore been proposed for use as a stationary liquid phase to effect partitioning of components in a stream undergoing gas chromatographic analysis.

However, liquid phases tried for this analysis of mercaptans have lacked the power to resolve completely the individual components. Because of this, components at about 0.2 percent concentration could not be heretofore analyzed. Furthermore, stationary liquid phases heretofore available prolonged the elution of methyl mercaptan and consequently subsequent peaks were not identified in the chromatogram.

It is important that for a stationary phase to be useful in this type of system it must be stable under the operating conditions of the column, must be selective in its solution of the components of interest, must be capable of uniform distribution within the analysis zone, should have the desired resolving power at ambient temperatures, and provide a short analysis time.

It is, therefore, an important object of this invention to provide a stable liquid phase for use in the quantitative separation and analysis of complex mixtures of volatile materials. It is also an object of the invention to provide a liquid phase which may be operated at ambient temperatures. It is a further object of the invention to provide a gas-liquid partition column packed with an adsorptive material on which the liquid phase is supported. A more specific object of the invention is to provide a stationary liquid phase which is adapted for the separation and analysis of alkyl mercaptans including methyl mercaptan. An additional object is to provide a system which may be used routinely for plant control of a methyl mercaptan process. These and other objects of the invention will become apparent as the description proceeds.

Briefly, according to my invention, I employ bis(2-methoxy ethyl) phthalate on 80–125 mesh celite as the liquid substrate, the substrate comprising about 0.45 gram per 1.0 gram of celite. This liquid substrate or stationary liquid phase provides a rapid, inexpensive, and accurate method of analysis. The entire analysis of a product stream of a methyl mercaptan can be accomplished in about 25 minutes using about 11 feet of ¼ inch packed tubing at ambient temperatures.

The liquid substrate is particularly effective in separating trace amounts of $C_2$–$C_4$ hydrocarbons in parts per million concentrations. It has resolving power for a wide boiling range of mercaptans and is particularly effective in separating methyl mercaptan (99 percent concentration) from trace quantities of other mercaptans, diethyl ether, hydrogen sulfide, dimethyl sulfide, carbon disulfide, and methyl alcohol.

Figure 2:
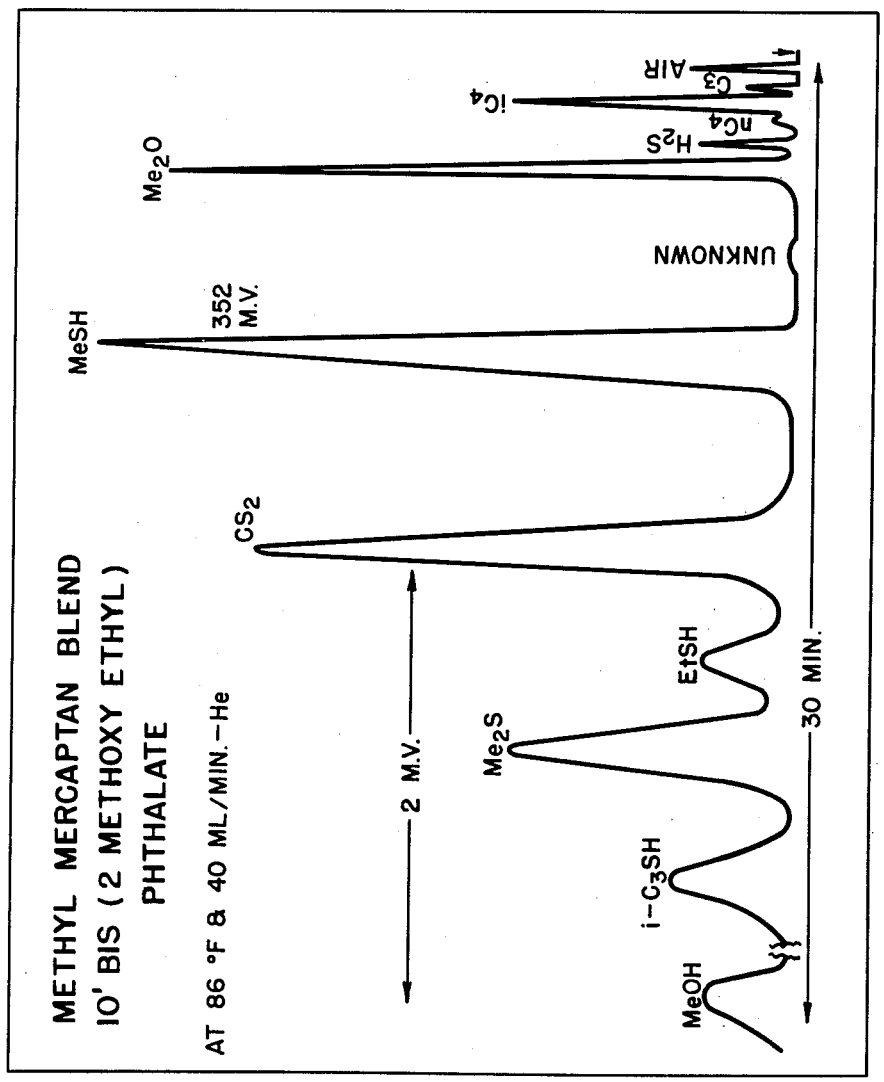

The invention will be described by reference to the accompanying drawings wherein:

FIGURE 1 is a schematic showing of the apparatus; and
FIGURE 2 is a typical gas chromatogram obtained with my liquid substrate.

Referring to FIGURE 1, the apparatus includes a sample bomb 10, the sample valve 11, the column 12, a detector 13, an eluting gas source 14, a pressure regulator 15 on the eluting gas source 14, and a vacuum pump 16. The valve 11 is provided with a loop 17, having a heater 18. If desired the column 12 may include a heater 19.

A column 12, for gas chromatographic analysis of methyl mercaptan, may comprise about 12 feet of stainless steel 0.25 inch tubing containing a substrate 12a comprising approximately 25 grams of 80–125 mesh celite as a packing. The celite is acid-treated, washed, and oven-dried for 8 to 15 hours at 300° C. before being placed in the column 12.

The substrate 12a is prepared by dissolving the required amount (0.4 gram per gram of celite) of bis 2-methoxyethylphthalate in approximately 75 mls. of C.P. ether. A slurry of this solution is made with the 25 grams of celite and excess ether is evaporated over a steam bath. The mass is then oven-dried for several hours at about 60° C.

Before placing the packing 12a, the column 12 is washed with acetone and dried with air. Oven-dried substrate is added to the tubing 12 in small portions, vibrating the tube after each addition as needed until the column is filled. A small glass wool plug 12b is provided at each end of the tubing 12 to keep the substrate 12a in place and prevent fines from being carried to the detector 13. The filled tube is then coiled to the desired size and shape.

Having prepared the column as described above, it is operated at about 40° C., with a helium gas flow rate of 40 ml. per minute. In this system the analysis may be accomplished in about 30 minutes.

A methyl mercaptan product stream sample of about 30 grams is collected in the sample bomb 10 and fed into a sampling valve 11 equipped with a heated 5 ml. sample loop 17. A mercury monometer 20 is attached to the feed line 21 on the sample valve 11 to permit measurement of sample admission pressure. Due to the wide boiling range of the product stream sample (hydrogen sulfide having a boiling point of −59.6° C. and methanol with a boiling point of 64.7° C.), special care must be given to the sampling.

The analysis for methyl mercaptan is made by adjusting the helium flow rate through the column 12 and the "sample" side of the detector 13 to 40 ml./minute. The heater 19 is adjusted to a constant 40° C. and the heater 18 on the sample loop 17 is adjusted to 130° F. The power supply 22 to the thermal conductivity cell 13 is set so that the voltage to the thermistor elements 13a is 4 volts. The apparatus is ready for use when a straight base line 25 is drawn on the chart 26 at full scale sensitivity of 4 mv.

The sample bomb 10 is attached to the sample valve 11 by a short (2 to 3 inches) piece of heavy walled Tygon tubing 11a. The entire volume between the sample bomb 10 and the manometer 20 is evacuated by means of the vacuum pump 16 and then pressured to 500 mm. Hg from the inverted sample bomb 10. The sample is allowed to remain in the heated loop 17 for about 60 seconds and then the vaporized sample is introduced into the chromatography column 12.

The apparatus is attenuated as required to keep each peak 28 on the chart 26 while maintaining maximum sensitivity. After methanol peak 30 has been eluted (about 30 minutes), the test is terminted.

To demonstrate the utility and advantages of my stationary liquid phase, I have made a number of separations using the described apparatus and method. Retention times obtained on a column 10 feet long at 86° F. with a flow of 40 ml./minute of helium were as follows:

| Component | Retention Time | Concentration, Weight Percent |
|---|---|---|
| Air | 1 min, 30 sec | |
| Propane | 1 min, 40 sec | .003 |
| Iso-butane | 1 min, 50 sec | .001 |
| n-Butane | 2 min | 0 |
| Hydrogen sulfide | 2 min, 35 sec | .01 |
| Dimethyl ether | 3 min | 0.56 |
| Methyl mercaptan | 6 min, 50 sec | 99.26 |
| Carbon disulfide | 11 min, 20 sec | .02 |
| Ethyl mercaptan | 14 min | .03 |
| Dimethyl sulfide | 15 min, 40 sec | .08 |
| Isopropyl mercaptan | 18 min, 40 sec | 0 |
| Methanol | 29 min | .04 |

The concentration of each component above was determined by measuring the area under each peak (FIGURE 2) using the method of half-band width (peak height × width at ½ peak height) and by dividing the area of each component peak by the total area of all components to give the concentration of each component in approximately weight percent.

The concentration of components is reported as weight percent to the nearest .01 percent and as mol percent. To obtain the latter the area of each component peak is multiplied by a factor relating mol percent to weight percent.

From the above it will be apparent that I have attained the objects of my invention and have provided a stationary liquid phase and a system using such phase wherein the difficulties of the prior art are avoided and excellent separations can be obtained at essentially room temperature.

The invention has been described with reference to preferred embodiments thereof, but it is to be understood that these are by way of illustration only. Accordingly, it is contemplated that modifications and variations can be made in the preparation and operating techniques without departing from the spirit of the invention.

What I claim is:

1. A method for analyzing mercaptan-containing gaseous mixtures which comprises contacting a gaseous mixture in a stream of an inert gas with an extended surface supporting a stationary liquid phase substrate comprising bis (2-methoxy ethyl) phthalate, said contacting being at a temperature in the range from about 35 to 80° C. and for a time within the range of about 5 to 45 minutes with a flow rate of inert gas at between 30 and 60 ml./minute.

2. The method in accordance with claim 1 in which the gaseous mixture contains methyl mercaptan.

3. The method of claim 1 wherein the gaseous mixture to be analyzed comprises light hydrocarbons, alcohol, and a mercaptan, the inert gas is helium, and the mercaptan is separately eluted from the stationary liquid phase.

4. In the analysis of difficulty separated mixtures of volatile materials, the method which comprises passing such a mixture at substantially ambient temperature over an extended surface film of a stationary liquid phase consisting essentially of bis (2-methoxy ethyl) phthalate, the said liquid phase being present in an amount sufficient to effect the desired analysis.

5. An improved method for separating difficulty separated complex gaseous and liquid mixtures containing methyl mercaptan which comprises the steps of passing such mixtures, combined with a stream of carrier gas, in contact with a stationary liquid phase consisting essentially of bis (2-methoxy ethyl) phthalate in concentration sufficient to effect the desired separation.

6. The method of separating and identifying mercaptan components of a complex mixture thereof with hydrocarbons and sulfides which comprises the steps of introducing such complex mixture into a stream of carrier gas, flowing the combined stream and mixture into contact with an extended film of a supported stationary liquid phase consisting essentially of bis (2-methoxy ethyl) phthalate in concentration sufficient to effect the desired separation whereby the individual components of the mitxure are retained by said film for different periods of time so that such components of the mixture are separately eluted from the said liquid phase film and successively discharged from the contacting zone.

7. An apparatus for conducting gas chromatographic analyses which includes an elongated column, an inert packing within said column, and a stationary liquid phase on said packing in said column, said liquid phase consisting essentially of bis (2-methoxy ethyl) phthalate which comprises a weight percent of the packing sufficient to effect the desired analysis.

8. The apparatus of claim 7 which includes means for main-taining the stationary liquid phase in said column at essentially ambient temperature during the analysis.

9. The improved apparatus for conducting analysis of complex mercaptan-containing mixtures by gas chromatography which includes an elongated column, an inert ceramic packing in said column, and a stationary liquid phase supported by said packing in said column, said stationary liquid phase consisting essentially of bis (2-methoxy ethyl) phthalate and comprising at least 0.40 weight percent of the said packing.

References Cited in the file of this patent

UNITED STATES PATENTS 2,875,606    Robinson _____ Mar. 3, 1959
2,930,443    Lamkin _____ Mar. 29, 1960